United States Patent [19]

Fukui et al.

[11] 4,352,321
[45] Oct. 5, 1982

[54] ELECTRONIC CONTROL METHOD AND APPARATUS FOR AUTOMOBILE AIR CONDITIONING SYSTEM WITH AIR PURIFIER

[75] Inventors: Tomonori Fukui, Kariya; Osamu Eguchi, Anjyo, both of Japan

[73] Assignee: Nippondenso Co., Ltd., Kariya, Japan

[21] Appl. No.: 272,102

[22] Filed: Jun. 10, 1981

[30] Foreign Application Priority Data

Jun. 17, 1980 [JP] Japan ................................ 55-81883

[51] Int. Cl.³ .............................................. B60H 3/00
[52] U.S. Cl. ...................................... 98/2.11; 165/16; 165/43; 236/49
[58] Field of Search ............... 165/16, 43; 62/78, 186; 236/49; 98/2.06, 2.11

[56] References Cited

U.S. PATENT DOCUMENTS 4,164,172  8/1979  Anderten et al. ................ 165/16 X
4,289,195  9/1981  Bellot et al. ..................... 165/16 X Primary Examiner—William E. Wayner
Attorney, Agent, or Firm—Cushman, Darby & Cushman

[57] ABSTRACT

In an electronic method and apparatus for an air conditioning system, an electrically operated switch door and an electrically operated air purifier are selectively activated in response to the respective degrees of pollution in the air within a passenger compartment and pollution of the outside air flowing into the compartment in consideration with the position of the switch door, thereby to enhance the elimination effect of the polluted air in the compartment and to avoid frequent operation of the air purifier.

6 Claims, 8 Drawing Figures

ELECTRONIC CONTROL METHOD AND APPARATUS FOR AUTOMOBILE AIR CONDITIONING SYSTEM WITH AIR PURIFIER

BACKGROUND OF THE INVENTION

1. Field of the Invention

The present invention relates to automobile air conditioning systems, and more particularly to an electronic control method and apparatus for an automobile air conditioning system which includes an electrically operated switch door for selectively allowing the flow of outside air or the flow of recirculated inside air into a passenger compartment through an air duct of the air conditioning system, and which is associated with an electrically operated air purifier for purifying the polluted air in the compartment.

2. Description of the Prior Art

During operation of an automobile air conditioner installed within a passenger compartment, the windows of the compartment are usually closed or only partially opened to decrease the ventilation rate of the air in the compartment so as to enhance the efficiency of the temperature control and the himidity control. As a result, polluted air is apt to remain in the passenger compartment due to smoking in the compartment or induction of polluted outside air. To rapidly eliminate the polluted air from the passenger compartment, the occupant often has to open the compartment windows, switch over the air induction channel, or activate an electrically operated air purifier. To avoid the trouble of such manual operations, several automatic control devices have been proposed which act to automatically activate an electrically operated switch door or an electrically operated air purifier depending upon the degree of air pollution in the passenger compartment. For example, a Japanese Patent Early Publication No. 55-51615 discloses a control device which comprises gas sensors respectively provided outside and inside a passenger compartment and an electrically operated switch door for switching over from outside air induction to inside air induction in response to the degree of outside air pollution sensed by the outside gas sensor.

In Japanese Patent Publications Nos. 47-36974 and 47-36975, a control device is disclosed which comprises a gas sensor provided outside or inside a passenger compartment and means for switching over from outside air induction to inside air induction and vice versa in response to an output signal from the gas sensor. Furthermore, a Japanese Utility Model Early Publication No. 54-139442 discloses a control device for energizing an electrically operated air purifier of the recirculation type in response to activation of a cigarette lighter switch. In the above-mentioned control, either the air induction switch door or the air purifier, but not both, is independently operated under predetermined conditions. This means that when the switch door is in a position to allow the flow of recirculated inside air into the compartment due to pullution of the outside air, the polluted air in the compartment can not be purified. When the switch door is in a position to allow the induction of outside air, the air purifier is continuously operated over a long period of time.

SUMMARY OF THE INVENTION

A primary object of the present invention is to provide an electronic control method and apparatus for selectively activating an electrically operated air induction switch door and an electrically operated air purifier of the recirculation type in response to the respective degrees of pollution in the air within a passenger compartment and the outside air flowing into the compartment from the exterior in consideration with the position of the switch door, thereby to enhance the elimination effect of the polluted air in the compartment and to avoid frequent operation of the air purifier.

According to an aspect of the present invention there is provided an electronic control method of controlling an automobile air conditioning system which includes an electrically operated switch door arranged in its first position to allow the flow of outside air into a passenger compartment through an air duct of the system and arranged in its second position to allow the flow of inside air recirculating into the compartment through the air duct, and which system is associated with an electrically operated air purifier for purifying the air in the compartment, said control method being characterized by the steps of:

producing at a predetermined time interval a series of first electric signals indicative of the degree of pollution of outside air flowing into the compartment through the air duct and detecting a first difference value between the preceding and following first electric signals, producing at the time interval a series of second electric signals indicative of the degree of pollution of inside air in the compartment and detecting a second difference value between the preceding and following second electric signals, switching over the switch door from its first position to its second position when the first difference value is larger than a predetermined first standard value under a first set of control conditions where the switch door is manually set in its first position, and subsequently either energizing the air purifier when the second difference value is larger than a predetermined second standard value or energizing the air purifier when the second difference value is larger than the second standard value under a second set of control conditions where the switch door is manually set in its second position.

Preferably, the step of switching over the switch door from its first position to its second position under the first set of control conditions includes the steps of:

maintaining the switch door in its second position for a predetermined first period of time, switching over the switch door from its second position to its first position after lapse of the first period of time, maintaining the energization of the air purifier for a predetermined second period of time if the air in the compartment has not been purified, and deenergizing the air purifier after lapse of the second period of time.

It is further preferable that the step of energizing the air purifier under the second set of control conditions includes the steps of:

maintaining the energization of the air purifier for a predetermined third period of time if the air in the compartment has not been purified, switching over the switch door from its second position to its first position after lapse of the third period of time and maintaining the switch door in its first position for a predetermined fourth period of time, and switching over the switch door from its first position to its second position and deenergizing the air purifier after lapse of the fourth period of time.

BRIEF DESCRIPTION OF THE DRAWINGS

Other objects and advantages of the present invention will become apparent from the following detailed description, reference being had to the accompanying drawings of which.

DESCRIPTION OF THE PREFERRED EMBODIMENTS

Figure 1:
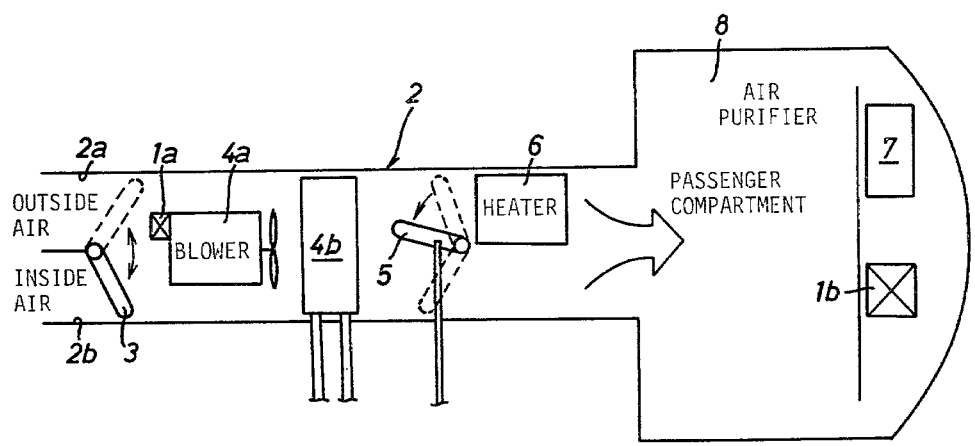
FIG. 1 schematically illustrates an automobile air conditioning system to which the present invention is applied.

Referring now to the drawings, in particular to FIG. 1 there is schematically illustrated an automobile air conditioner 2 which is installed within a passenger compartment 8. A first gas sensor 1a of the solid thermal conduction type is provided within an air duct of the air conditioner 2, and a second gas sensor 1b is also provided on the rear package tray in the compartment. The air conditioner 2 is provided in its air duct with a switch door 3 which is moved by an electrically operated actuator (not shown) to its first position to allow the flow of outside air entering the compartment through a first inlet 2a of the air duct and moved to its second position to allow the flow of inside air recirculating into the compartment through a second inlet 2b of the air duct.

The air conditioner 2 is provided therein with a blower 4a which is driven by an electric power supply from the vehicle battery to impel the air from the switch door 3 through an evaporator 4b. A part of the cooled air from evaporator 4b is warmed by a heater 6 under control of an air-blend door 5 and flows into the compartment, and the remaining cooled air flows directly into the compartment. The first gas sensor 1a is located downstream of the first inlet 2a to detect the degree of pollution in the outside air flowing into the compartment through the first inlet 2a. In the actual practice of the present invention, the first gas sensor 1a may be located within the first inlet 2a. The second gas sensor 1b acts to detect the degree of pollution in the compartment 8, and an electrically operated air purifier 7 is mounted on the rear package tray to be operated in response to an output signal from sensor 1b, as described in detail hereinafter.

Figure 2:
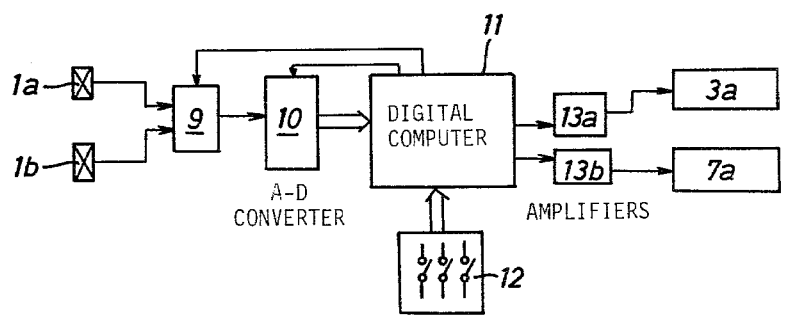
FIG. 2 is a schematic block diagram of an electronic control apparatus in accordance with the present invention.

Disclosed in FIG. 2 is an electronic control circuit for the automobile air conditioner 2 and the air purifier 7 in accordance with the present invention, which control circuit comprises a multiplexer 9 for receiving first and second electric output signals from the sensors 1a and 1b, an analog-to-digital or A-D converter 10 for converting the output signals from sensors 1a and 1b into electric binary signals, and a digital computer 11 connected to A-D converter 10 and to a manual switch assembly 12. Each of the binary signals from A-D converter 10 is applied to the computer 11 when required by the computer. The computer 11 receives a constant voltage from a voltage stabilizer (not shown) which receives the electric power supply from the vehicle battery under actuation of an ignition switch for the prime mover.

The computer 11 comprises a central processing unit or CPU which is connected to an input-output device or I/O through a bus line in a usual manner. CPU is also connected through the bus line to timers, a clock circuit, a read only memory or ROM, and a random access memory or RAM. I/O receives the electric binary signals from A-D converter 10 and stores them in RAM temporarily. The stored signals are selectively read out from RAM and applied to CPU through the bus line. CPU serves to execute predetermined computer programs in accordance with clock signals from the clock circuit and to produce control signals therefrom based on a command signal from switch assembly 12. The clock circuit is cooperable with a crystal oscillator in a usual manner to produce the clock signals at a predetermined frequency.

The manual switch assembly 12 includes three switches for respectively setting automatic operation of the air conditioner 2, manual operation of the same, and selection between outside air induction and inside air induction. The control circuit further comprises a pair of amplifiers 13a, 13b for amplifying the control signals from computer 11, a first driving circuit 3a for energizing the electrically operated actuator of the switch door 3 in response to the amplified control signal from amplifier 13a, and a second driving circuit 7a for energizing the air purifier 7 in response to the amplified control signal from amplifier 13b.

Figure 3:
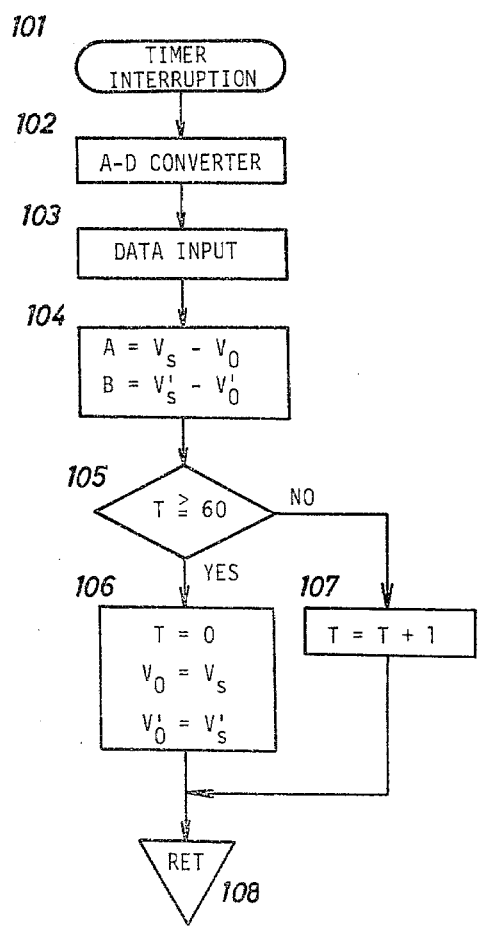
FIG. 3 is a flow chart illustrating operation of the digital computer shown in block form in FIG. 2.

Operational modes of the control circuit will be described in detail with reference to respective flow charts shown in FIGS. 3, 4 and 5 to clearly disclose the control method of the present invention. In operation of the control circuit, when the computer program proceeds to step 101 as shown in FIG. 3, timer interruption processing of computer 11 is conducted at a time interval of one second to convert output signals from sensors 1a, 1b respectively into first and second binary signals by A-D converter 10 at step 102. The binary signals are read out by computer 11 to calculate the difference A between a value $V_s$ of the first binary signal and a first initial standard level $V_0$ and to calculate the difference B between a value $V_s'$ of the second binary signal and a second initial standard level $V_0'$. The difference value A represents the degree of pollution of the outside air from the first inlet 2a of air conditioner 2, and the difference value B represents the degree of pollution of the inside air in the compartment 8. At step 105 of the program the computer 11 discriminates whether or not the lapse of time from the timer interruption is sixty seconds. If the answer is "yes", the program proceeds to step 106 where the computer 11 substitutes the initial standard levels $V_0$, $V_0'$ for the respective values $V_s$ and $V_s'$, and subsequently the program returns at step 108 to repeat the above-mentioned calculation. If the answer is "no", the program proceeds to step 107 where the computer 11 continues to calculate the lapse of time until sixty seconds are completed, whereupon it returns at step 108 to repeat the above-mentioned calculation.

Figure 4:
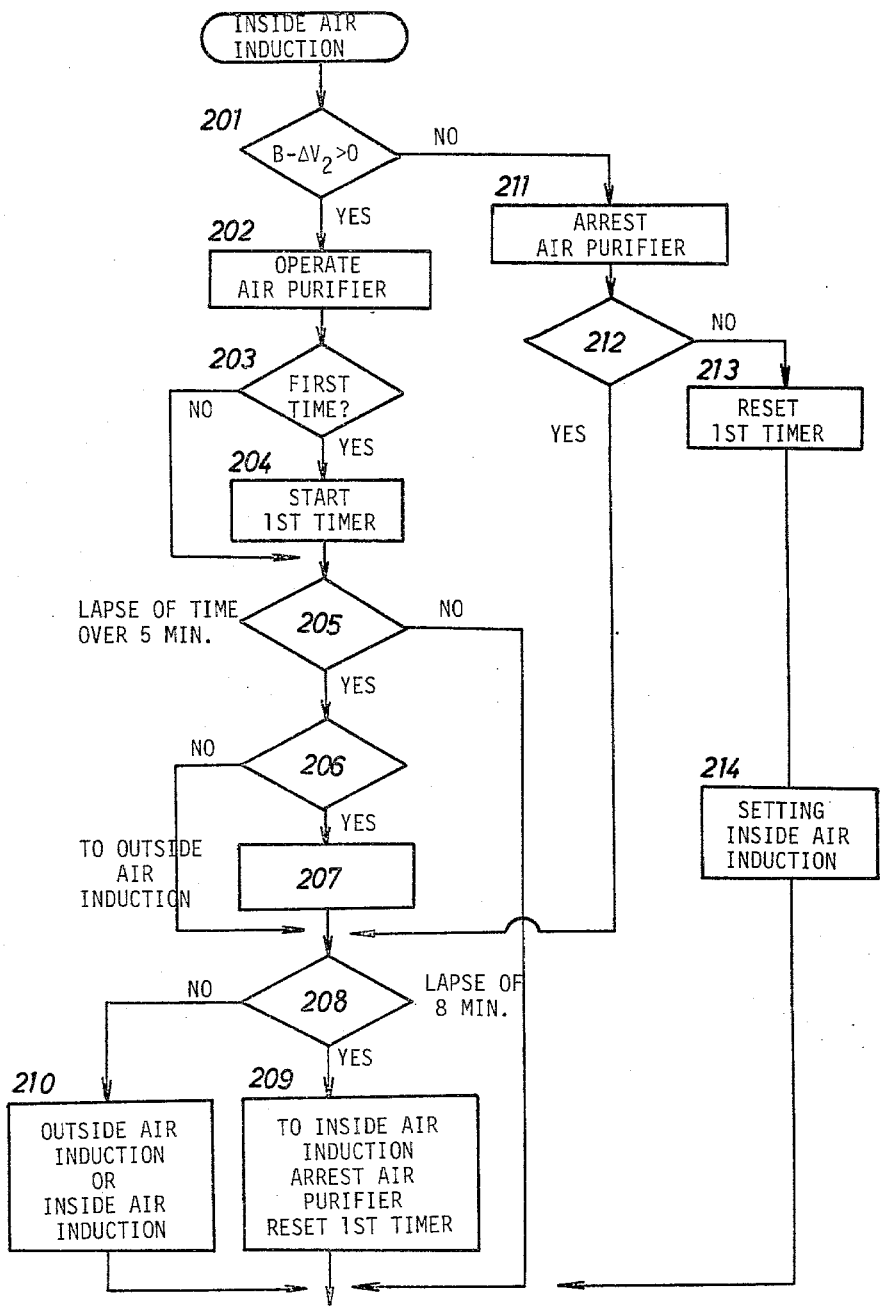
FIG. 4 is a flow chart illustrating operation of the digital computer under a first set of control conditions where the switch door of FIG. 1 is in a position to allow the flow of inside air into the passenger compartment.

In the case that the switch assembly 12 is manually set to position the switch door 3 of air conditioner 2 to allow the flow of recirculated inside air into the compartment 8, the computer 11 executes the program illustrated by the flow chart in FIG. 4. In the case that the switch assembly 12 is manually set to position the switch door 3 to allow the flow of outside air into the compartment 8, the computer 11 executes the program illustrated by the flow chart in FIG. 5.

When the switch door 3 is in its second position under control of the switch assembly 12 to allow the flow of inside air recirculating into the compartment, the computer 11 executes the program illustrated in FIG. 3 at each cycle of the timer interruption processing and executes the computer program illustrated by the flow chart of FIG. 4. At step 201 of the program, the computer 11 discriminates whether or not a value of $B - \Delta V_2$ is larger than zero value, where the character $\Delta V_2$ represents a predetermined first standard value indicative of the degree of inside air pollution to be purified. If the answer is "yes", the program proceeds to step 202 where the computer 11 produces a control signal therefrom which acts to energize the air purifier 7. If the answer is "no", the program proceeds to step 211 where the air purifier 7 is arrested due to lack of a control signal from computer 11. When the program proceeds to step 203 in response to energization of the air purifier 7, the computer 11 discriminates whether or not a first timer (1) of computer 11 is reset. If the answer is "yes", the program proceeds to step 204 where the first timer (1) of computer 11 starts to measure the lapse of time from the start of operation of the air purifier 7. If the answer is "no" at step 203 because of operation of the first timer (1), the program proceeds to step 205.

At step 205 of the program, the computer 11 discriminates whether or not the lapse of time is more than five minutes. At this stage, if the air in the compartment has not been adequately purified in spite of continuous operation of the air purifier 7, the answer is discriminated by computer 11 as "yes" and the program proceeds to step 206. At step 206, the computer 11 discriminates whether or not the lapse of time is five minutes. If the answer is "yes", the program proceeds to step 207 where the computer 11 produces a control signal therefrom which acts to move the switch door 3 to its first position from its second position so as to allow the flow of outside air into the compartment 8. In addition, if the answer is "no" at step 205 because of arrest of the air purifier 7, the program returns to the initial step 201. At step 206, if the answer is "no", the program proceeds to step 208. At step 208, the computer 11 discriminates whether or not the lapse of time is more than eight minutes from the start of operation of the air purifier 7. If the answer is "yes", the program subsequently proceeds to step 209 where the computer 11 produces a control signal therefrom which acts to return the switch door 3 to its second position to allow the flow of inside air recirculating into the compartment, to deenergize the air purifier 7 and to reset the first timer (1) of computer 11. If answer is "no" at step 208, the program proceeds to step 210 where the computer 11 executes the program illustrated by the flow chart of FIG. 5 as described in detail later.

Furthermore, if the program proceeds to step 212 due to arrest of the air purifier 7, the computer discriminates whether or not the lapse of time from the start of the first timer (1) is more than five minutes. If the answer is "yes", the program proceeds to step 208. If the answer is "no", the program proceeds to a step 213 where the computer resets the first timer (1) thereof and proceeds the program to step 214. At this stage, the computer 11 produces a control signal for setting the switch door 3 to its second position.

Figure 5:
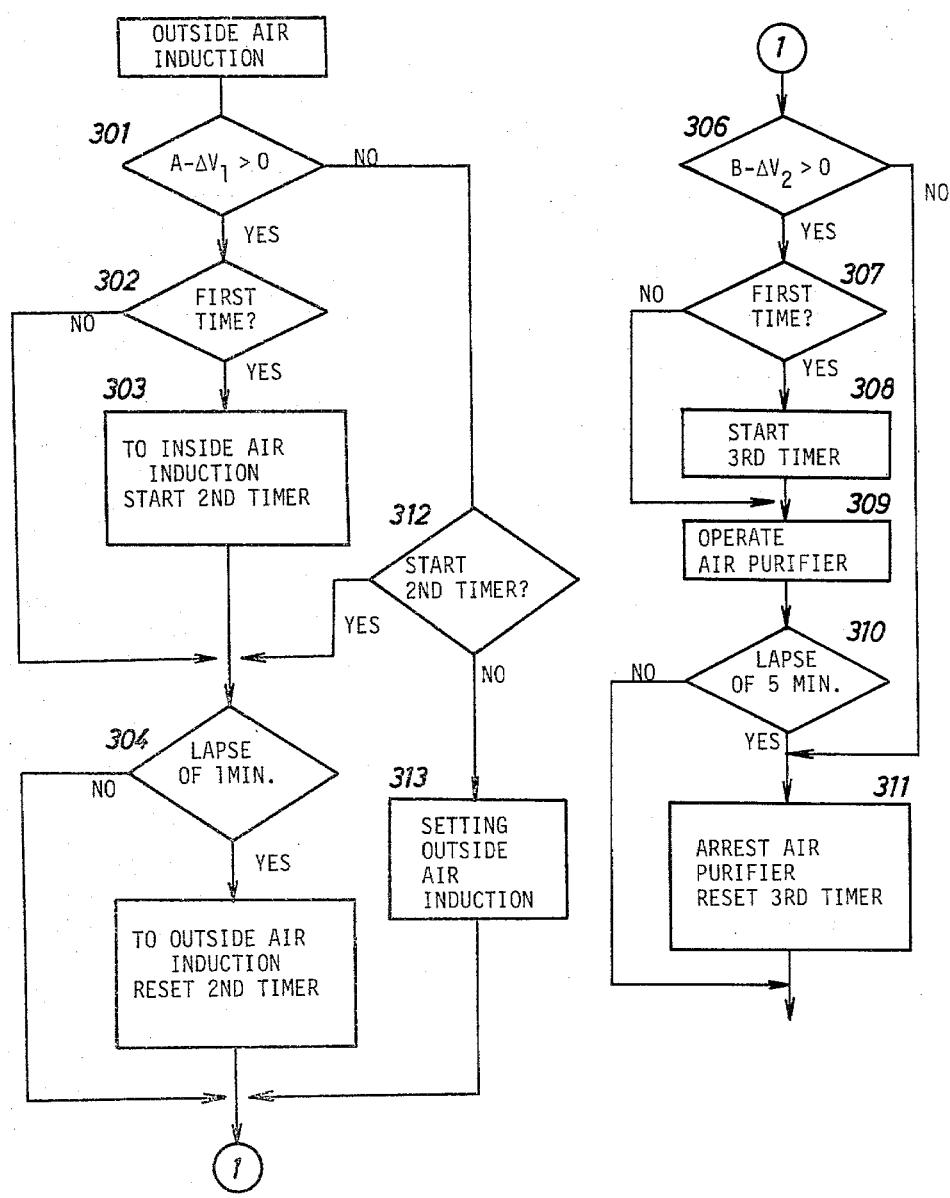
FIG. 5 is a flow chart illustrating operation of the digital computer under a second set of control conditions where the switch door is in a position to allow the flow of outside air into the passenger compartment.

When the switch door 3 is set in its first position under manual control of the switch assembly 12 to allow the flow of outside air into the compartment, the computer 11 executes the program illustrated in FIG. 3 at each cycle of the timer interruption processing and executes the computer program illustrated by the flow chart of FIG. 5. At step 301 of the program, the computer discriminates whether or not a value of $A - \Delta V_1$ is larger than zero value, where the character represents a second standard value indicative of the degree of outside air to be purified. If the answer is "yes", the program proceeds to step 302 where the computer 11 discriminates whether or not a second timer (2) of computer 11 is reset. If the answer is "yes", the program proceeds to step 303 where the computer 11 produces a control signal therefrom which acts to move the switch door 3 from its first position to its second position to allow the flow of inside air into the compartment 8. Simultaneously, the second timer (2) of computer 11 starts to measure the lapse of time from switchover of the switch door 3 to its second position. When the program proceeds to step 304, the computer 11 discriminates whether or not the lapse of time is more than one minute. If the answer is "yes", the computer 11 produces a control signal therefrom at step 305 which acts to return the switch door 3 to its first position to allow the flow of outside air into the compartment and to reset the second timer (2) of computer 11.

Subsequently, the program proceeds to step 306 where the computer 11 discriminates whether or not a value of $B - \Delta V_2$ is larger than zero value. If the answer is "yes", the program proceeds to step 307 where the computer 11 discriminates whether or not a third timer (3) is reset. If the answer is "yes", the computer 11 proceeds the program to step 308 where the third timer (3) of computer 11 starts to measure the lapse of time from its start. When the program proceeds to step 309, the computer 11 produces a control signal therefrom which acts to energize the air purifier 7. At step 310 of the program, the computer 11 discriminates whether or not the lapse of time is more than five minutes. At this stage, if the air in the compartment has not been purified in spite of continuous operation of the air purifier 7, the answer is discriminated by computer 11 as "yes" to proceed the program to step 311. At step 311, the computer 11 produces a control signal therefrom which acts to deenergize the air purifier 7 and to reset the third timer (3) of computer 11. Thereafter, the program returns to the initial step 301.

During the above execution of the computer program, if the answer is "no" at step 301, the computer 11 proceeds the program to step 312 where the computer 11 discriminates whether or not the second timer (2) of computer 11 starts. If the answer is "yes", the computer 11 proceeds the program to step 304, and if the answer is "no", the program proceeds to step 313 where the computer 11 produces a control signal therefrom which acts to set the switch door 3 to its first position so as to allow the flow of outside air into the compartment 8. If the answer is "no" at step 302, the computer 11 proceeds the program to the step 304, and if the answer is "no" at step 304, the computer 11 proceeds the program to step 306. At step 306, if the answer is "no", the air purifier 7 is arrested by a control signal produced from computer 11 at step 311. Furthermore, if the answer is "no" at step 307, the computer 11 proceeds the program to step 309, and if the answer is "no" at step 310, the program returns to the initial step 301.

Figure 7:
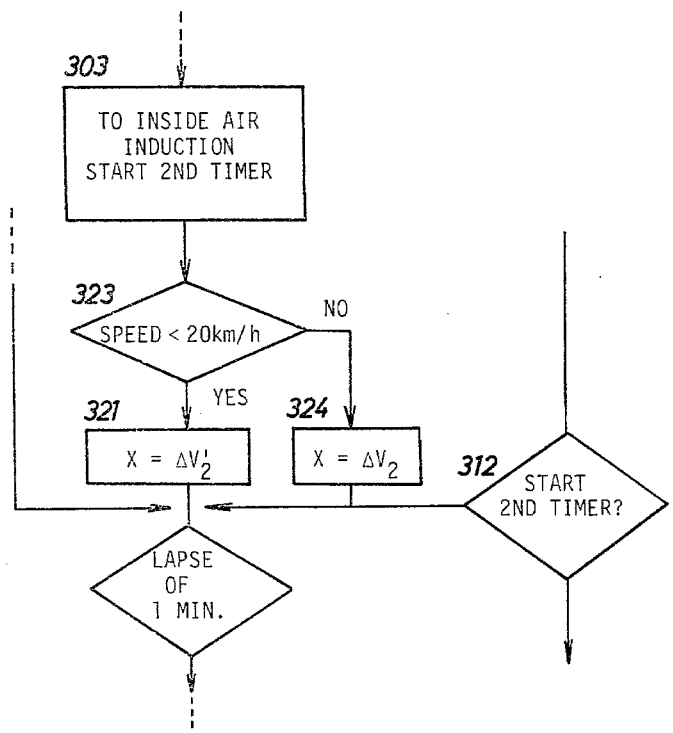
Figure 8:
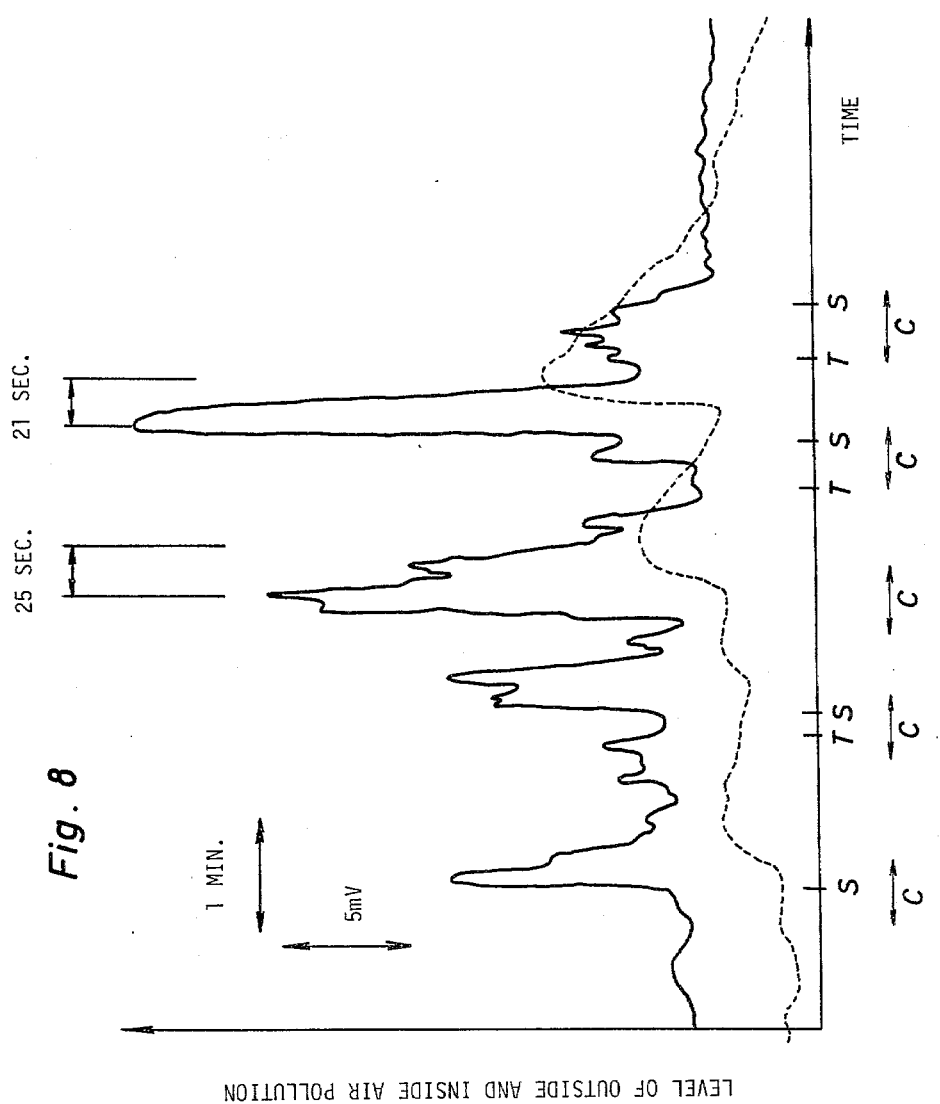
FIG. 8 is a graph illustrating the respective degrees of outside air and inside air in relation to start and arrest of an automobile in front.

Assuming that the automobile travels on a town road with many crossings during the operation of the control circuit under execution of the computer program of FIG. 5, pollution levels of the outside and inside air will be detected by sensors 1a and 1b as shown in FIG. 7. In the figure, the character T indicates arrest of the automobile, the character S indicates start of the automobile, and the character C indicates passage of the automobile over each crossing. If said automobile is travelling behind another automobile, a high level of outside air pollution will be detected by the first gas sensor 1a at each start of the automobile in front, and subsequently a high level of inside air pollution will be detected by the second gas sensor 1b at a delay of approximately twenty seconds. Under such conditions, if a value of $\Delta V=5$ mV is determined to execute the computer program of FIG. 5, the air purifier 7 will be operated frequently in response to an output signal from the second gas sensor 1b. In the case that the presence of smell-less gases is detected by the second gas sensor 1b causing it to operate the air purifier 7, the passengers will not sense any smell in the inside air, and they will be afraid that the air purifier 7 is being erroneously operated.

Figure 6:
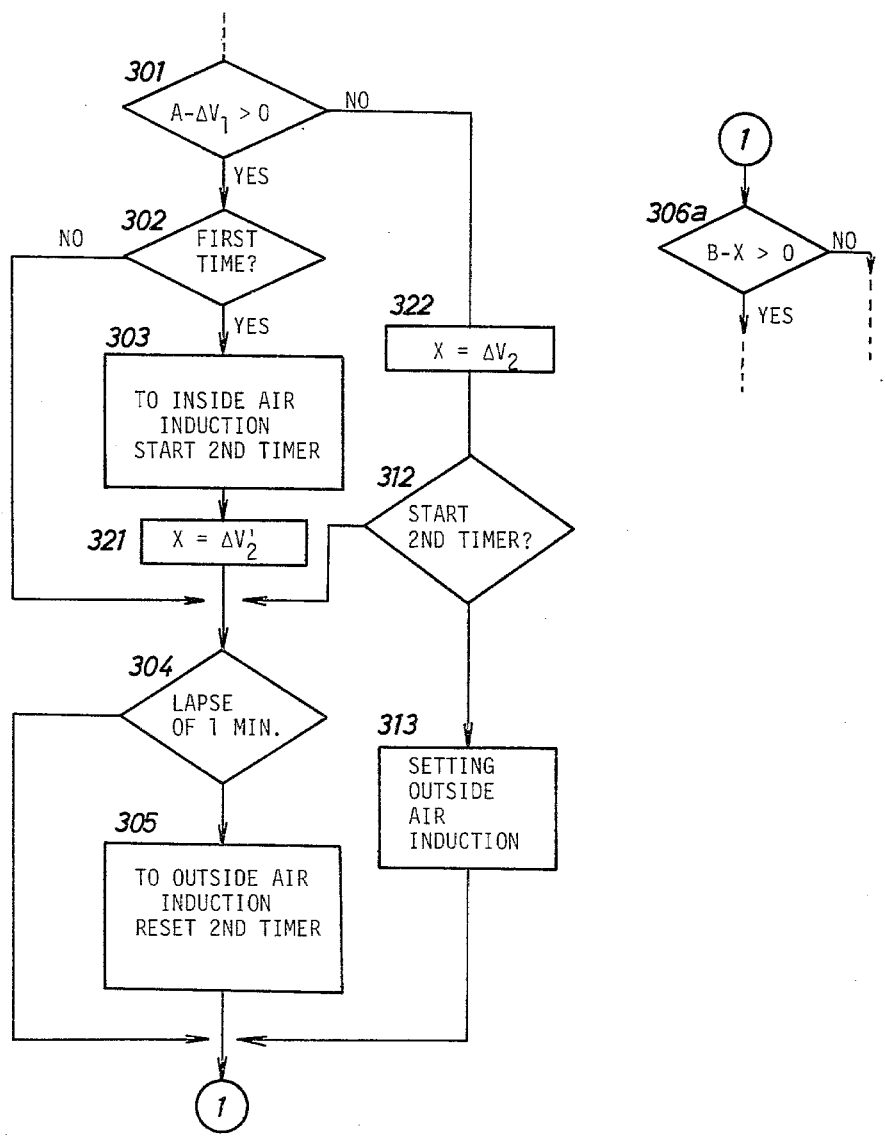
FIGS. 6 and 7 illustrate modifications of the flow chart of FIG. 5.

To avoid such an uncertain state of mind for the passengers, the computer program may be modified as shown in FIG. 6. The modification in FIG. 6 is characterized by provision of steps 321 and 322 and by replacement of step 306 of FIG. 5 by a step 306a. At step 306a of the program, the first standard value of $\Delta V_2$ is substituted for a value of X, and at step 321 of the program the value of X is substituted for a value of $\Delta V_2'$. At step 322, the value of X is substituted for the first standard value $\Delta V_2$. In this case, the value of $\Delta V_2'$ is defined to be larger than the value of $\Delta V_2$. This means that when the degree of outside air pollution is detected as a high value by the first gas sensor 1a, sensitivity by second gas sensor 1b is adjusted to be slightly lower in relation to the actual degree of inside air pollution caused by the outside air pollution. As a result, the air purifier 7 is operated only when the degree of inside air pollution is at a relatively high level. In the actual practice, it has been observed that a good result is obtainable when the value of $\Delta V_2'$ is larger than the value of $\Delta V_2$ by approximately 20%–50%.

For the above-mentioned purpose, the computer program of FIG. 6 may be modified as shown in FIG. 7. The modification in FIG. 7 is characterized by provision of additional steps 323 and 324. At step 323, the computer 11 discriminates whether or not the actual speed of the automobile is lower than 20 km/h. If the answer is "yes", the program proceeds to step 321 where the computer 11 substitutes the value of X for the value of $\Delta V_2'$. If the answer is "no", the program proceeds to step 324 where the computer 11 substitutes the value of X for the first standard value $\Delta V_2$. During execution of the modified computer program by computer 11, when the automobile decelerates and arrests at a crossing or traffic jam area on a town road, the first gas sensor 1a detects a high level of pollution of outside air exhausted from the automobile in front. In this instance, after the switch door 3 is moved to its second position at step 303 to recirculate the inside air in the compartment, the computer 11 discriminates the actual speed of the automobile at step 323 of the program to proceed the program to step 321. Then, the computer 11 substitutes the value of X for the value of $\Delta V_2'$ at step 321 to lower substantially the sensitivity of the second gas sensor 1b at step 306a. When the actual speed of the automobile becomes higher than 20 km/h, the computer 11 substitutes the value of X for the value of $\Delta V_2$ at step 324 to conduct the normal operation of the control circuit.

In the actual practices, the present invention may be adapted to an automobile air conditioning system of which the switch door is steplessly displaced to control the mixture ratio of outside and inside air. In this application, if an electrically operated switch is provided to discriminate whether or not the actual induction amount of outside air is larger than a predetermined value, the above computer programs of FIGS. 4 to 7 will be executed by computer 11 in dependence upon an output signal for the switch.

Although certain specific embodiments of the present invention have been shown and described, it is obvious that many modifications thereof are possible. The invention, therefore, is not intended to be restricted to the exact showing of the drawings and description thereof, but is considered to include reasonable and obvious equivalents.

What is claimed is:

1. An electronic control method of controlling an automobile air conditioning system which includes an electrically operated switch door arranged in its first position to allow the flow of outside air into a passenger compartment through an air duct of said system and arranged in its second position to allow the flow of inside air recirculating into said compartment through said air duct, and which system is associated with an electrically operated air purifier for purifying the air in said compartment, said control method comprising the steps of:
    producing at a predetermined time interval a series of first electric signals indicative of the degree of pollution of outside air flowing into said compartment through said air duct and detecting a first difference value between the preceding and following first electric signals;
    producing at said time interval a series of second electric signals indicative of the degree of pollution of inside air in said compartment and detecting a second difference value between the preceding and following second electric signals;
    switching over said switch door from its first position to its second position when said first difference value is larger than a predetermined first standard value under a first set of control conditions where said switch door is manually set in its first position, and subsequently either energizing said air purifier when said second difference value is larger than a predetermined second standard value or energizing said air purifier when said second difference value is larger than said second standard value under a second set of control conditions where said switch door is manually set in its second position.

2. A method of controlling an automobile air conditioning system as claimed in claim 1, wherein the step of switching over said switch door from its first position to its second position under said first set of control conditions includes the steps of:
    maintaining said switch door in its second position for a predetermined first period of time;

switching over said switch door from its second position to its first position after lapse of said first period of time;

maintaining the energization of said air purifier for a predetermined second period of time if the air in said compartment has not been purified; and deenergizing said air purifier after lapse of said second period of time.

3. A method of controlling an automobile air conditioning system as claimed in claim 1, wherein the step of energizing said air purifier under said second set of control conditions includes the steps of:

maintaining the energization of said air purifier for a predetermined first period of time if the air in said compartment has not been purified;

switching over said switch door from its second position to its first position after lapse of said first period of time and maintaining said switch door in its first position for a predetermined second period of time; and switching over said switch door from its first position to its second position and deenergizing said air purifier after lapse of said second period of time.

4. A method of controlling an automobile air conditioning system as claimed in claim 1 or 2, further comprising the steps of:

substituting said second standard value for a predetermined larger value after said switch door is switched over from its first position to its second position such that said air purifier is energized when said second difference value is larger than said substituted larger standard value; and maintaining said second standard value when said first difference value is smaller than said first standard value.

5. A method of controlling an automobile air conditioning system as claimed in claim 1 or 2, further comprising the steps of:

discriminating whether or not the actual speed of the automobile is higher than a predetermined speed value after said switch door is switched over from its first position to its second position;

substituting said second standard value for a predetermined larger value when the actual speed of the automobile is lower than said predetermined speed value; and maintaining said second standard value when the actual speed of the automobile is higher than said predetermined speed value.

6. An electronic control apparatus for an automobile air conditioning system which includes an electrically operated switch door arranged in its first position to allow the flow of outside air into a passenger compartment through an air duct of said system and arranged in its second position to allow the flow of inside air recirculating into said compartment through said air duct, and which system is associated with an electrically operated air purifier for purifying the air in said compartment, said control apparatus comprising:

first sensing means for producing at a predetermined time interval a series of first electric binary signals indicative of the degree of pollution of outside air flowing into said compartment through said air duct and detecting a first difference value between the peceding and following first electric binary signals;

second sensing means for producing at said time interval a series of second electric binary signals indicative of the degree of pollution of inside air in said compartment and detecting a second difference value between the preceding and following second binary signals;

a digital computer programmed to discriminate whether or not said first difference value is larger than a predetermined first standard value under a first set of control conditions where said switch door is manually set in its first position, said computer producing a first control signal therefrom when said first difference value is larger than said first standard value, said computer being further programmed to discriminate whether or not said second difference value is larger than a predetermined second standard value, said computer producing a second control signal therefrom either when said second difference value is larger than said second standard value under said first set of control conditions or when said second difference value is larger than said second standard value under a second set of control conditions where said switch door is manually set in its second position;

first driving means for switching over said switch door from its first position to its second position in response to said first control signal from said computer, said switch door being switched over from its second position to its first position due to lack of said first control signal; and second driving means for energizing said air purifier in response to said second control signal from said computer.

* * * * *